United States Patent
Erlmann et al.

(10) Patent No.: US 8,462,680 B2
(45) Date of Patent: Jun. 11, 2013

(54) METHOD AND SYSTEM FOR OPERATING A COMMUNICATION NETWORK

(75) Inventors: Markus Erlmann, Nürnberg (DE); Jens Grebner, Nürnberg (DE)

(73) Assignee: Siemens AG, Munich (DE)

( * ) Notice: Subject to any disclaimer, the term of this patent is extended or adjusted under 35 U.S.C. 154(b) by 594 days.

(21) Appl. No.: 12/664,625

(22) PCT Filed: Jun. 14, 2007

(86) PCT No.: PCT/EP2007/005437
§ 371 (c)(1),
(2), (4) Date: Dec. 14, 2009

(87) PCT Pub. No.: WO2008/151653
PCT Pub. Date: Dec. 18, 2008

(65) Prior Publication Data
US 2010/0189033 A1    Jul. 29, 2010

(51) Int. Cl.
*H04W 36/00* (2009.01)
(52) U.S. Cl.
USPC .................... 370/310; 370/331; 455/436
(58) Field of Classification Search
None
See application file for complete search history.

(56) References Cited

U.S. PATENT DOCUMENTS

| | | | |
|---|---|---|---|
| 6,844,814 B2 * | 1/2005 | Chin et al. | 340/539.22 |
| 6,931,249 B2 * | 8/2005 | Fors et al. | 455/436 |
| 7,176,808 B1 * | 2/2007 | Broad et al. | 340/870.07 |
| 7,400,594 B2 * | 7/2008 | Pereira et al. | 370/310 |
| 7,663,481 B2 * | 2/2010 | Kim et al. | 340/539.22 |
| 7,801,079 B2 * | 9/2010 | Saidi et al. | 370/331 |
| 2006/0128402 A1 | 6/2006 | Lee et al. | |
| 2006/0270411 A1 * | 11/2006 | Grayson | 455/444 |
| 2011/0202189 A1 * | 8/2011 | Venkatakrishnan et al. | 700/286 |

FOREIGN PATENT DOCUMENTS

| | | |
|---|---|---|
| EP | 1 331 763 | 7/2003 |
| WO | WO 99/14898 | 3/1999 |

* cited by examiner

*Primary Examiner* — Robert Scheibel
(74) *Attorney, Agent, or Firm* — Cozen O'Connor

(57) ABSTRACT

A network node, a coordination node, a management node, a communication system and method for operating a communication system having a first type of communication network and a second type of communication network, wherein a request message identifying a network node in the first type of communication network is sent to the coordination node in the first type of communication network by the management node in the second type of communication network, the network node is removed from the first type of communication network by the coordination node, the removed network node is included in the second type of communication network by the management node, and a data interchange is performed between the management node and the network node inserted in the second type of communication network.

14 Claims, 1 Drawing Sheet

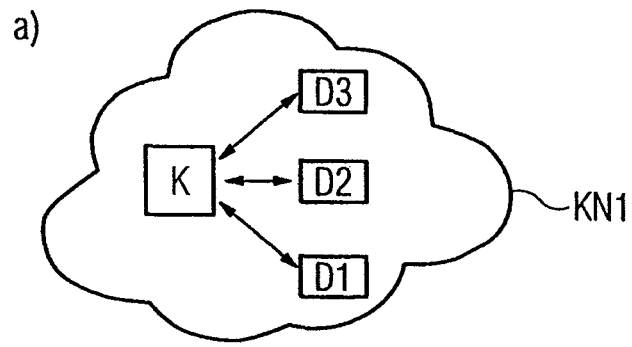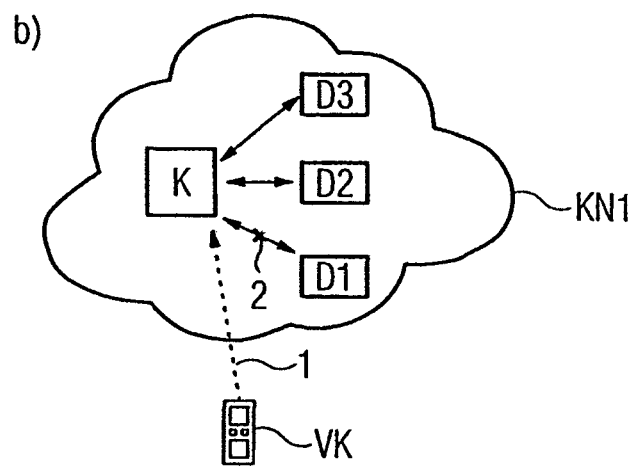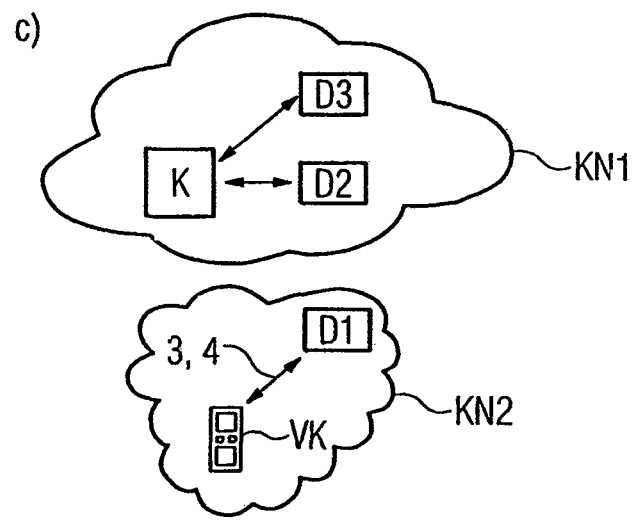

METHOD AND SYSTEM FOR OPERATING A COMMUNICATION NETWORK

CROSS-REFERENCE TO RELATED APPLICATIONS

This is a U.S. national stage of International Application No. PCT/EP2007/005437, filed on 14 Jun. 2007. The contents of that application are expressly incorporated herein by reference.

BACKGROUND OF THE INVENTION

Communication systems are used in various technical sectors. Here, there is frequently a requirement for data to be exchanged reliably and with a minimal time delay between data sources and data sinks within the communication system, i.e., with a guaranteed latency. An example of this is the exchange of data between a central control unit and network nodes, or devices with actuators and/or sensors, of a communication system used in automation technology. Corresponding data transmission can occur for example using the IEEE 802.15.4 communication standard, whereby a transmission channel used for data transmission or the transmission frame used in the transmission channel can be divided into time slots, the use of which makes possible communication, i.e., a unidirectional or a bidirectional data exchange, having a predetermined time behavior.

In communication systems in general, and also in a communication system of the type described above in particular, as a result of total and permanent utilization of a transmission channel which is available for data transmission purposes by the corresponding user data traffic, such as due to corresponding cyclical data transmissions by the network nodes using guaranteed time slots of a transmission frame, the situation can arise such that no further bandwidth, i.e., no transmission resources, is available for further data traffic, such as to conFIGURE one of the network nodes of the communication system.

It is therefore an object of the present invention to provide an especially efficient and flexible method for operating a communication system.

This and other objects and advantages are achieved in accordance with the invention by a method for operating a communication system having a communication network of a first type and a communication network of a second type in which a request message identifying a network node in the communication network of the first type is sent to a coordination node of the communication network of the first type by a management node in the communication network of the second type, the network node is removed from the communication network of the first type by the coordination node, the network node is included in the communication network of the second type by the management node and a data exchange is performed between the management node and the network node in the communication network of the second type.

The method in accordance with the invention advantageously offers the management node in the communication network of the second type the capability to perform a data exchange with a network node without hereby imposing a load on the communication network of the first type, in which the network node is arranged. To this end, in accordance with the invention, the management node in the communication network of the second type sends a request message to the coordination node in the communication network of the first type. In this request message, the particular network node in the communication network of the first type is identified, with which the management node in the communication network of the second type seeks to establish a connection. The sending of the request message by the management node to the coordination node can in this situation occur by way of any desired type of wireless or wired communication interface. Here, the implication is that it is not necessarily a matter of a communication interface used in the communication network of the first type or in the communication network of the second type for communicating with the respective network node.

Based on the received request message, the coordination node now removes the network node from the communication network of the first type. Consequently, it becomes possible in the next method step for the network node to be included by the management node in the communication network of the second type. A data exchange subsequently occurs between the management node and the network node in the communication network of the second type. The capability thus advantageously exists to completely decouple data transmissions between the management node and the network node from data transmissions from or to the network nodes in the communication network of the first type. Any adverse effect on the quality of service or the transmission quality in the communication network of the first type is thus advantageously avoided.

It should be noted that as a general rule a plurality of network nodes are operated in the communication network of the first type. Here, communication can occur in the communication network of the first type both exclusively between the coordination node and the respective network node and also where applicable between the network nodes themselves in the communication network of the first type. On the other hand, in the communication network of the second type a data exchange preferably occurs exclusively between the management node and the network node in question, which has previously been included in the communication network of the second type. Here, it is possible that the communication network of the second type consists exclusively of the management node and the network node in question, i.e., that the management node in the communication network of the second type merely establishes a connection at any point in time with that network node with which a data exchange is to be performed.

In the preferred embodiment, the method in accordance with the invention is configurable such that a user data network is used as a communication network of the first type and a configuration network is used as a communication network of the second type, and such that within the context of the data exchange a configuration or a change to an existing configuration of the network node occurs. This presently contemplated embodiment is preferred because through this a separation of the transmission of user data or productive data and the transmission of configuration data or project planning data can occur. With regard to a corresponding change to an existing configuration, this can be for example, a case of changing a parameter for the network node. Any functional interference with the user data network is advantageously prevented in accordance with the presently contemplated embodiment by the fact that the corresponding configuration or change in configuration is performed not in the communication network of the first type but in the communication network of the second type.

The method in accordance with the contemplated embodiments of the invention can advantageously also be executed such that after the network node has been removed from the communication network of the first type, inclusion of the network node exclusively in the communication network of the second type is permitted. After being removed from the communication network of the first type the network node preferably attempts to automatically re-register directly on a communication network of the communication system. In this case, the communication network of the first type advantageously does not permit a corresponding re-registration with subsequent re-inclusion of the network node in the communication network of the first type. This can occur, for example, due to the communication network of the first type or the coordination node of the communication network of the first type ignoring requests from the network node for re-inclusion in a communication network. On the other hand, the communication network of the second type or the management node in the communication network of the second type responds to corresponding requests and includes the network node in the communication network of the second type. As a result, a corresponding removal of the network node from the communication network of the first type and also a subsequent inclusion of the network node in the communication network of the second type can advantageously occur in an automated manner.

In an especially preferred embodiment of the method in accordance with the invention, the network node is removed by the management node from the communication network of the second type after a data exchange has occurred. Removal in this manner is advantageous because the network node is thus advantageously made available again for inclusion in a different communication network of the communication system.

In a further preferred embodiment, the method in accordance with the invention can also be executed such that the network node remains in the communication network of the second type after a data exchange has occurred. As a result, a permanent assignment of the network node to a different communication network of the communication system is advantageously made possible, whereby prior to commencement of operation of the network node in the communication network of the second type, for example, a change in a parameter set for the network node is possible.

In a preferred embodiment, the method is executed such that, after a data exchange has taken place with the network node, by sending a release message the management node allows the coordination node to again include the network node in the communication network of the first type. The sending of the release message by the management node to the coordination node can in turn occur in a wireless or wired fashion and constitutes the prerequisite for enabling the network node to be re-included in the communication network of the first type after a data exchange has occurred.

In an especially preferred embodiment of the method in accordance with the invention, the network node is re-included by the coordination node in the communication network of the first type after a data exchange has occurred. As a result, the network node can advantageously resume its operation in the communication network of the first type after a data exchange has occurred with the management node, i.e., for example, following a reconfiguration of the network node.

In another advantageous embodiment, the method in accordance with the invention is implemented such that an identity of the communication network of the second type, with which the network node is to register after its removal from the communication network of the first type, is notified to the network node by the coordination node. As a result, the identity of the communication network of the second type, with which the network node is to subsequently register, is advantageously already known to the network node prior to its removal from the communication network of the first type. Consequently, on the one hand the corresponding registration process can be accelerated; furthermore in this situation, a dynamic specification or allocation of the identity of the communication network of the second type is advantageously possible, i.e., a static, permanent reservation of an identity for the communication network of the second type is advantageously not required.

In a further preferred embodiment of the method in accordance with the invention, the management node conveys to the coordination node the identity of the communication network of the second type to be notified to the network node. As a result, the coordination node of the communication network of the first type is advantageously informed of the identity of the communication network of the second type to be notified to the network node. As a result, a static storage of the information concerned is advantageously also not required on the part of the coordination node.

In a further especially preferred embodiment the method in accordance with the invention is implemented such that the management node conveys to the network node an identity of the particular communication network with which the network node is to register after a data exchange has occurred. As a result, after a data exchange has taken place the network node can advantageously perform a specific registration with the communication network, the identity of which has been conveyed to the network node by the management node. With regard to the communication network concerned, this can be both the communication network of the first type and also any desired further communication network of the communication system.

Basically, within the scope of the contemplated embodiments of the method of the invention, any types of network node can be used. Particularly advantageous, however, is an embodiment of the method whereby network nodes connected wirelessly to the respective communication network are used. Accordingly, the communication with the network nodes occurs both in the communication network of the first type and also in the network node of the second type by way of a corresponding radio interface. As a result, this offers the advantage that an automated and thus also especially efficient execution of the method in accordance with the contemplated embodiments of the invention is made possible. Simultaneously, wirelessly connected network nodes offer the advantage that they can be used in a versatile and flexible manner due to a wired connection to a communication network is not being required.

The contemplated embodiments of the method can preferably also be implemented in a form such that a communication network in accordance with the IEEE 802.15.4 standard is used as the communication network of the first type and/or as the communication network of the second type. Use of the IEEE 802.15.4 standard is advantageous because this is a robust and popular standard for wireless communication. Here, advantageously, the power consumption of network nodes or terminal devices operated in accordance with this standard as devices is particularly comparatively low, with the result that battery operated network nodes can also achieve a period of use of several months or years without having a battery change.

In a further especially preferred embodiment of the method, the data transmission between the network node and the coordination node and also between the network node and the management node occurs using different communication protocols. Consequently, the network node is advantageously able to communicate by way of at least two communication protocols, i.e., the network node has at least two different "communication stacks" or "protocol stacks". Here, one of the communication protocols can be used for the communication in the communication network of the first type, whereby a further communication protocol remains inactive until the network node is removed from the communication network of the first type. At this juncture, a switchover of the communication stacks used within the network node can now occur, i.e., the communication protocol for operating the network node in the communication network of the first type is deactivated and the further communication protocol is activated for the duration of operation of the network node in the communication network of the second type. This offers the advantage that a restriction to the effect that the same communication protocol be used in the communication network of the first type and in the communication network of the second type is advantageously not required. By Accordingly, the flexibility of the possible applications of the contemplated embodiments of the method are further enhanced.

Advantageously, the contemplated embodiments of the method is are implemented such that the communication network of the first type and the communication network of the second type utilize different transmission channels. This advantageously serves to ensure that the communication or data transmission in the communication network of the first type and in the communication network of the second type are completely independent of each other. That is, any adverse effect on the availability and the quality of service of the transmission resources provided in the communication network of the first type resulting from the data exchange in the communication network of the second type is excluded.

In a further preferred embodiment of the method in accordance with the invention, a communication system from the automation technology sector having network nodes with sensors and/or actuators is used. The present embodiment is advantageous because, particularly in the area of automation technology, high demands are made on the availability of the communication networks used and also on a transmission of data with a minimal delay, observed under all circumstances. Moreover, with regard to network nodes with sensors and/or actuators a change, such as a change in a parameter for the sensor or actuator in question, is in practice also required comparatively frequently, with the result that implementation of the present embodiment of the method is also especially advantageous in the area of automation technology.

The invention furthermore relates to a network node.

With respect to the network node, it is an object of the present invention to provide a network node which supports an especially efficient and flexible method for operating a communication system.

This and other objects and advantages are achieved in accordance with the invention by a network node having means for implementing the method according to the invention or means for implementing one of the preferred embodiments of the method described above.

With respect to the advantages of the network node in accordance with the invention and its preferred embodiments, reference should be made to the corresponding statements in connection with the contemplated embodiments of the method in accordance with the invention and its preferred embodiments.

The invention furthermore relates to a coordination node.

With respect to the coordination node, it is an object of the present invention to provide a coordination node which provides an especially efficient and flexible method for operating a communication system.

This and other objects and advantages are achieved in accordance with the invention by a coordination node having means for implementing the contemplated embodiments of the method in accordance with the invention or means for implementing one of the preferred embodiments of the method described above.

With respect to the advantages of the coordination node in accordance with the invention and its preferred embodiments, reference should in turn be made to the corresponding statements in connection with the discussed embodiments of the method and its preferred embodiments.

The present invention furthermore relates to a management node.

With respect to the management node, it is an object of the present invention is to provide a management node which supports an especially efficient and flexible method for operating a communication system.

This and other objects and advantages are achieved in accordance with the invention by a management node having means for implementing in the disclosed embodiments of the method or means for implementing one of the preferred embodiments of the method described above.

The advantages of the management node in accordance with the invention and of its preferred embodiments will in turn emerge from the previous statements in connection with the contemplated embodiments of the method and its preferred embodiments.

In an especially preferred embodiment, the management node in accordance with the invention is additionally conFIGUREd as a coordination node. As a result, the management node is advantageously conFIGUREd not only for including a network node and for performing a data exchange with this network node, but moreover can also remove this network node, after receiving a corresponding request message from a further management node, from the communication network of the second type managed by it. An appropriately conFIGUREd management node thus advantageously constitutes an especially flexible and versatile embodiment of the management node according to the invention.

The invention furthermore relates to a communication system.

With respect to the communication system, it is an object of the present invention to provide an especially efficient and flexible communication system.

This and other objects and advantages are achieved in accordance with the invention by a communication system with a network node according to the invention, a coordination node according to the invention and a management node according to the invention or a management node in accordance with the previously described especially preferred development of the management node according to the invention.

With respect of to the advantages of the communication system in accordance with the invention, reference should be made in turn to the previous statements in connection with the contemplated embodiments of the method and its preferred embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in the following with reference to an exemplary embodiment in which:

the only FIGURE shows the time sequence of an exemplary embodiment of the method in accordance with the invention in a schematic diagram in three parts a), b) and c).

DETAILED DESCRIPTION OF THE PREFERRED EMBODIMENTS

In the FIGURE, the sequence of an exemplary embodiment of the method in accordance with the invention is shown in such a manner that the situation at a different point in time is illustrated in each case in the parts a), b) and c).

It should be assumed in the following that a communication network of the first type KN1 illustrated for the first time in a) is a communication network used in the area of automation technology. This has a coordination node K, such as a control unit, and network nodes D1, D2, D3, such as sensors and/or actuators or devices having sensors and/or actuators. The communication network of the first type KN1 is a communication network in accordance with the IEEE 802.15.4 standard, whereby the network nodes D1, D2, D3 communicate with the coordination node K by using so-called guaranteed time slots GTS. Corresponding guaranteed time slots are allocated to the respective network nodes D1, D2, D3 for their sole use, such that a deterministic communication with predetermined latency between the network nodes D1, D2, D3 and the coordination node K is ensured. According to the IEEE 802.15.4 standard, the communication is wireless in this case, i.e., the coordination node and the network nodes D1, D2, D3 each have at their disposal a corresponding wireless radio interface.

In the initial situation illustrated in part a) of the FIGURE, user data is exchanged between the wireless participants in the form of the network nodes D1, D2, D3 and the coordination node K, which is referred to as a "coordinator" in light of its function in the IEEE 802.15.4 standard. The data exchange occurs in the communication network of the first type, which fulfills the function of a user data network. Consequently, the communication network of the first type is essentially reserved for the transmission of user data, with the result that other types of data cannot or should not be transmitted or at least can or should be transmitted only under certain restrictions.

In order to now be able to make a change in the configuration, for example of the network node D1 in the communication network of the first type KN1 without having an adverse effect on the efficiency of the communication network of the first type KN1 in the process, in accordance with part b) of the FIGURE a management node VK of a communication network of the second type sends a request message to the coordination node K in the communication network of the first type KN1 in a first method step 1. With this request message, the coordination node K is instructed to remove the network node D1 identified in the request message from the communication network of the first type KN1 in the form of the user data or productive network. The transmission of the request message by the management node VK, which can fulfill the function of a so-called "human machine interface (HMI)", e.g., has an operating terminal for performing a configuration of one of the network nodes D1, D2, D3 of the communication system, to the coordination node K can occur wirelessly by way of a radio interface or also in a wired manner, such as by way of an interface according to the PROFINET standard.

In the second method step 2 the coordination node K removes the network node D1 from the communication network of the first type KN1 in accordance with the illustration in part b) of the FIGURE based on the request message previously received in method step 1.

In the exemplary embodiment shown in the FIGURE, in accordance with part c) of the FIGURE, the management node VK now includes the network node D1 previously removed from the first communication network KN1 in a second communication network KN2 in the third method step 3. According to the illustration in the FIGURE, this can be effected by the management node VK creating a communication network of the second type KN2 in the form of a project planning network with a fixed identity. This means As a result, that the management node VK at this point simultaneously implements the function of a coordination node. It should be noted, however, that it is also possible for the communication network of the second type KN2 to be static in nature, i.e. a fixed identity is assigned to the communication network of the second type KN2 regardless of whether or not it has a network node at the respective point in time, and the communication network of the second type KN2 is thus ready at any time to include network nodes.

In detail, the inclusion of the network node D1 that is removed from the communication network of the first type KN1 in the communication network of the second type KN2 can, for example, occur such that the network node D1 restarts and attempts to register with an available communication network. The communication network of the first type KN1 does not however allow any re-registration. That is, the communication network KN1 does not respond to a corresponding request by the network node D1 for re-inclusion in the communication network of the first type KN1. The communication network of the second type KN2 does however react to the corresponding request and enables the network node D1 to register with the management node VK in the communication network of the second type KN2 in accordance with method step 3 in part c) of the FIGURE.

Advantageously, the network node D1 can already be notified by the coordination node K in the communication network of the first type KN1 of the identity of the communication network of the second type KN2, with which it is to register following its removal from the communication network of the first type KN1. The identity of the communication network of the second type KN2 in question is advantageously notified to the coordination node K in the communication network of the first type KN1 beforehand by the management node VK in the communication network of the second type KN2. This course of action has the advantage that the reservation of a fixed identity for the configuration network, i.e., the communication network of the second type KN2, is not required in static form.

In the following, a data exchange can now be performed between the management node VK and the network node D1 in the communication network of the second type KN2. Within the framework of such a data exchange, indicated in the FIGURE by method step 4 in part c), a change in the configuration of the network node D1 can be made by the management node VK, for example. Here, the type of the data exchanged in each case is dependent on the respective application. A corresponding change in the configuration of the network node D1 can thus, in the case of a network node with a temperature sensor, consist for example in the fact that a temperature threshold for the network node D1 is changed. As an alternative to a corresponding change in a configuration, it is for example also conceivable that data, such as a log file, for instance within the scope of an error analysis, is transmitted by the network node D1 to the management node VK or that a general update of software for the network node D1 occurs.

Following completion of the configuration, the management node VK advantageously informs the coordination node K in the communication network of the first type KN1 in a method step (not illustrated in the time sequence of the FIGURE) that the network node D1 may re-join the communication network of the first type KN1 in the form of the user data network. The corresponding communication between the management node VK and the coordination node K can in turn occur in a wireless or wired fashion.

In the next step, the management node VK removes the network node D1, for which a change in the configuration or project planning has previously occurred, from the communication network of the second type KN2. Alternatively, it should be understood that the network node D1 can independently deregister itself from the communication network of the second type KN2. Thereupon, the network node D1 reattempts to register itself with one of the available communication networks KN1, KN2. The coordination node K in the communication network of the first type ICN1 responds to the corresponding request from the network node D1 and re-includes the network node D1 in the communication network of the first type KN1 in the form of the user data network. The network node D1 is thus now available again in the following in the communication network of the first type KN1.

Preferably, following completion of the configuration the management node VK can convey to the network node D1 an identity of that communication network with which the network node D1 is to register after a data exchange has taken place, i.e., after the change in the configuration has been completed. Accordingly, after completion of the data exchange in the communication network of the second type KN2, a coordination node, where applicable also different from the coordination node K in the communication network of the first type KN1, can advantageously be permanently assigned to the network node D1, i.e., following a change in its configuration the network node D1 can also be included in a communication network different from the communication network of the first type KN1.

The network node D1 advantageously has at its disposal two or more different communication stacks. In other words, the network node D1 supports communication by way of corresponding different communication protocols. Here, one of these communication stacks is advantageously used for the communication in the communication network of the first type KN1 and another is used for the communication, (i.e., the data transmission), in the communication network of the second type KN2. Consequently, communication protocols, and thus transmission methods, which basically differ technically can advantageously also be used in the communication network of the first type KN1 and in the communication network of the second type. It is therefore conceivable, for example, that the communication network of the first type KN1 is operated using a non-standardized communication protocol, whereas the operation in the communication network of the second type KN2 can occur using a standardized communication protocol, such as ZigBee for example, based on the IEEE 802.15.4 standard.

In an embodiment, it is furthermore possible that the management node VK itself is advantageously simultaneously conFIGUREd as a coordination node. Here, after completion of its configuration or reconfiguration, the network node D1 advantageously remains in the communication network of the second type KN2. The method in accordance with the invention can thus advantageously also be used to assign a network node D1, for instance in the form of an automation technology device, to a different coordination node, i.e., a different communication network. Here, within the scope of the data exchange, the possibility exists for instance to make available a new parameter set to the network node D1 prior to commencement of operation in the communication network of the second type KN2. As a result, no manual parameterization effort advantageously arises if a device in the form of the network node D1 is intended to switch communication network or is assigned to a different coordination node.

From the preceding statements it can be recognized as a fundamental advantage of the described exemplary embodiment of the method in accordance with the invention that in a communication system productive operation and configuration operations may be performed. That is, the transmission of user data and configuration data can occur in different communication networks and thereby for example in particular also on different channels of one frequency band. In particular, the data transmission in the communication network of the first type KN1, i.e., the productive operation, is consequently not disrupted or adversely affected by the data exchange occurring in the communication network of the second type KN2, i.e., by the configuration operation. Furthermore, as a result of the channel separation of productive and configuration operation more bandwidth is available on the channel for the productive operation, which can be used for transmitting user data. Similarly, correspondingly more bandwidth is accordingly also available for the data exchange in the communication network of the second type KN2. The configuration thus does not occur in competition with the transmission of user data. As a result, the opportunity furthermore advantageously exists to first check or test changed settings on the network nodes, for example, affecting automation technology sensors or actuators, before the network nodes are placed into productive operation again. That is, for example, before the network nodes are re-included in the communication network of the first type KN1. Possible incorrect settings can thus already be advantageously recognized and corrected prior to re-inclusion in the communication network of the first type KN1.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a communication system having a first type communication network (KN1) and a second type of communication network (KN2), the method comprising the steps of:
   sending a request message identifying a network node (D1) in the first type of communication network (KN1) to a coordination node (K) in the first type of communication network (KN1) by a management node (VK) in the second type of communication network (KN2);
   removing the network node (D1) from the communication network of the first type (KN1) by the coordination node (K);
   including the removed network node (D1) in the second type of communication network (KN2) by the management node (VK);

performing a data exchange between the management node (VK) and the network node (D1) in the second type of communication network (KN2); and permitting exclusive inclusion of the network node (D1) in the second type of (KN2) communication network after removal of the network node (D1) from the first type of communication network (KN1).

2. The method as claimed in claim 1, wherein the first type of communication network comprises a user data network and the second type of a communication network comprises a configuration network, and wherein a configuration or a change to an existing configuration of the network node (D1) occurs during the data exchange.

3. The method as claimed in claim 1, wherein the network node (D1) is removed by the management node (VK) from the communication network of the second type (KN2) after the data exchange has occurred.

4. The method as claimed in claim 1, wherein the network node (D1) remains in the second type of communication network (KN2) after the data exchange has occurred.

5. The method as claimed in claim 1, further comprising the step of:

sending a release message from the management node (VK) after the data exchange has occurred with the network node (D1) to allow the coordination node (K) to re-include the network node (D1) in the first type of communication network (KN1).

6. The method as claimed in claim 1, wherein the network node (D1) is re-included by the coordination node (K) in the first type of communication network (KN1) after the data exchange has taken place.

7. The method as claimed in claim 1, further comprising the step of:

providing to the network node (D1) a notification of an identity of the second type of communication network with which the network node (D1) is to register, by the coordination node (K) after removal of the network node (D1) from the first type of communication network of the (KN1).

8. The method as claimed in claim 7, wherein the management node (VK) conveys to the coordination node (K) the identity of the second type of communication network (KN2) to be notified to the network node (D1).

9. The method as claimed in claim 7, wherein the management node (VK) conveys to the network node (D1) an identity of a particular communication network with which the network node (D1) is to register after the data exchange has occurred.

10. The method as claimed in claim 1, wherein the network node is (D1) wirelessly connectable to the first type and second type of communication networks (KN1, KN2).

11. The method as claimed in claim 1, wherein at least one of the first type of communication network (KN1) and the second type of communication network (KN2) operates in accordance with the IEEE 802.15.4 standard.

12. The method as claimed in claim 1, wherein the data transmission between the network node (D1) and the coordination node (K), and between the network node (D1) and the management node (VK) occurs based on different communication protocols.

13. The method as claimed in claim 1, wherein the first type of communication network and the second type of communication network (KN2) utilize different transmission channels.

14. The method as claimed in claim 1, wherein the communication system comprises an automation technology sector system including network nodes (D1, D2, D3), each of the network nodes having at least one of a sensor and an actuator.

* * * * *